(12) United States Patent
Toya (10) Patent No.: US 10,410,486 B2
(45) Date of Patent: Sep. 10, 2019

(54) BATTERY PACK ABNORMALITY DETECTION SYSTEM

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 3 days.

(21) Appl. No.: 15/218,197

(22) Filed: Jul. 25, 2016

(65) Prior Publication Data

US 2017/0054309 A1    Feb. 23, 2017

(30) Foreign Application Priority Data

Aug. 21, 2015   (JP) ................. 2015-163602

(51) Int. Cl.

| | |
|---|---|
| H02J 7/00 | (2006.01) |
| G08B 13/14 | (2006.01) |
| H01M 10/48 | (2006.01) |
| H01M 10/46 | (2006.01) |
| H01M 10/42 | (2006.01) |
| G08B 25/10 | (2006.01) |

(52) U.S. Cl.
CPC ......... *G08B 13/1436* (2013.01); *G08B 25/10* (2013.01); *H01M 10/4257* (2013.01); *H01M 10/46* (2013.01); *H01M 10/48* (2013.01); *H02J 7/0004* (2013.01); *H02J 7/0006* (2013.01)

(58) Field of Classification Search
CPC ....... Y02E 60/12; H02J 7/0004; H02J 7/0006; H02J 7/0042; H02J 7/0045; H01M 10/48; H01M 10/4257; H01M 10/44; H01M 10/46; G08B 13/1436; G08B 25/10
USPC .................................................. 320/106, 107
See application file for complete search history.

(56) References Cited

U.S. PATENT DOCUMENTS

| | | | | |
|---|---|---|---|---|
| 6,397,088 | B1 * | 5/2002 | Roo | H04B 1/3805 |
| | | | | 455/572 |
| 6,664,000 | B1 * | 12/2003 | Sonobe | H01M 2/34 |
| | | | | 429/100 |
| 6,888,354 | B1 * | 5/2005 | Gofman | H02J 7/0031 |
| | | | | 320/137 |
| 8,274,395 | B1 * | 9/2012 | Erickson | G06F 11/3013 |
| | | | | 340/636.13 |
| 2002/0151230 | A1 * | 10/2002 | Kanno | B63J 99/00 |
| | | | | 440/84 |

(Continued)

FOREIGN PATENT DOCUMENTS

JP        11-040205        2/1999

*Primary Examiner* — Richard Isla
*Assistant Examiner* — Mohammed J Sharief
(74) *Attorney, Agent, or Firm* — Greenblum & Bernstein, P.L.C.

(57) ABSTRACT

An electrical-power storage device includes: a storage battery; a movement detector that detects movement of the electrical-power storage device including the storage battery; a reporter that reports that the electrical-power storage device has an abnormality to outside; and a controller that causes the reporter to report that the electrical-power storage device has an abnormality, when the movement detector detects movement of the electrical-power storage device, and the storage battery is not executing discharging.

10 Claims, 4 Drawing Sheets

(56) References Cited

U.S. PATENT DOCUMENTS

| | | | | |
|---|---|---|---|---|
| 2005/0012591 A1* | 1/2005 | Tomljenovic | ......... | G08B 25/08 340/5.31 |
| 2006/0244577 A1* | 11/2006 | Tanaka | ................... | B60R 25/04 340/429 |
| 2007/0096691 A1* | 5/2007 | Duncan | .................. | G06F 1/263 320/114 |
| 2008/0297116 A1* | 12/2008 | Odaohhara | ............ | H01M 2/34 320/137 |
| 2010/0059590 A1* | 3/2010 | Anzai | ................. | G06K 7/0008 235/439 |
| 2012/0299721 A1* | 11/2012 | Jones | .................... | B60R 25/33 340/521 |

* cited by examiner

BATTERY PACK ABNORMALITY DETECTION SYSTEM

BACKGROUND

1. Technical Field

The present disclosure relates to an electrical-power storage device having an abnormality detection function.

2. Description of the Related Art

In recent years, electric equipment, such as mobile phone terminals and electric bicycles, equipped with storage batteries has come into widespread use. Japanese Unexamined Patent Application Publication No. 11-40205 (hereinafter referred to as "Patent Document 1") discloses a battery system in which an abnormality determination is made using an acceleration sensor to sense impact force applied to equipment including a lithium battery.

In Patent Document 1, when the impact force sensed by the acceleration sensor exceeds a set value, it is determined that there is an abnormality.

SUMMARY

One non-limiting and exemplary embodiment provides an electrical-power storage device that can sense that an electrical-power storage device has an abnormality by using an abnormality detection method different from methods of related art.

In one general aspect, the techniques disclosed here feature an electrical-power storage device including: a storage battery; a movement detector that detects movement of the electrical-power storage device including the storage battery; a reporter that reports that the electrical-power storage device has an abnormality to outside; and a controller that causes the reporter to report that the electrical-power storage device has an abnormality, when the movement detector detects movement of the electrical-power storage device, and the storage battery is not executing discharging.

According to the configuration described above, for example, when the electrical-power storage device is stolen, the electrical-power storage device can sense that it has an abnormality and can report the abnormality to outside.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The embodiment described below represents a specific example of the present disclosure. Numerical values, shapes, constituent elements, steps, the order of steps, and so on described in the embodiment below are examples, and are not intended to limit the present disclosure.

An abnormality detection system for an electrical-power storage device according to an embodiment will be described below with reference to the accompanying drawings.

<1. Configuration>

Figure 1:
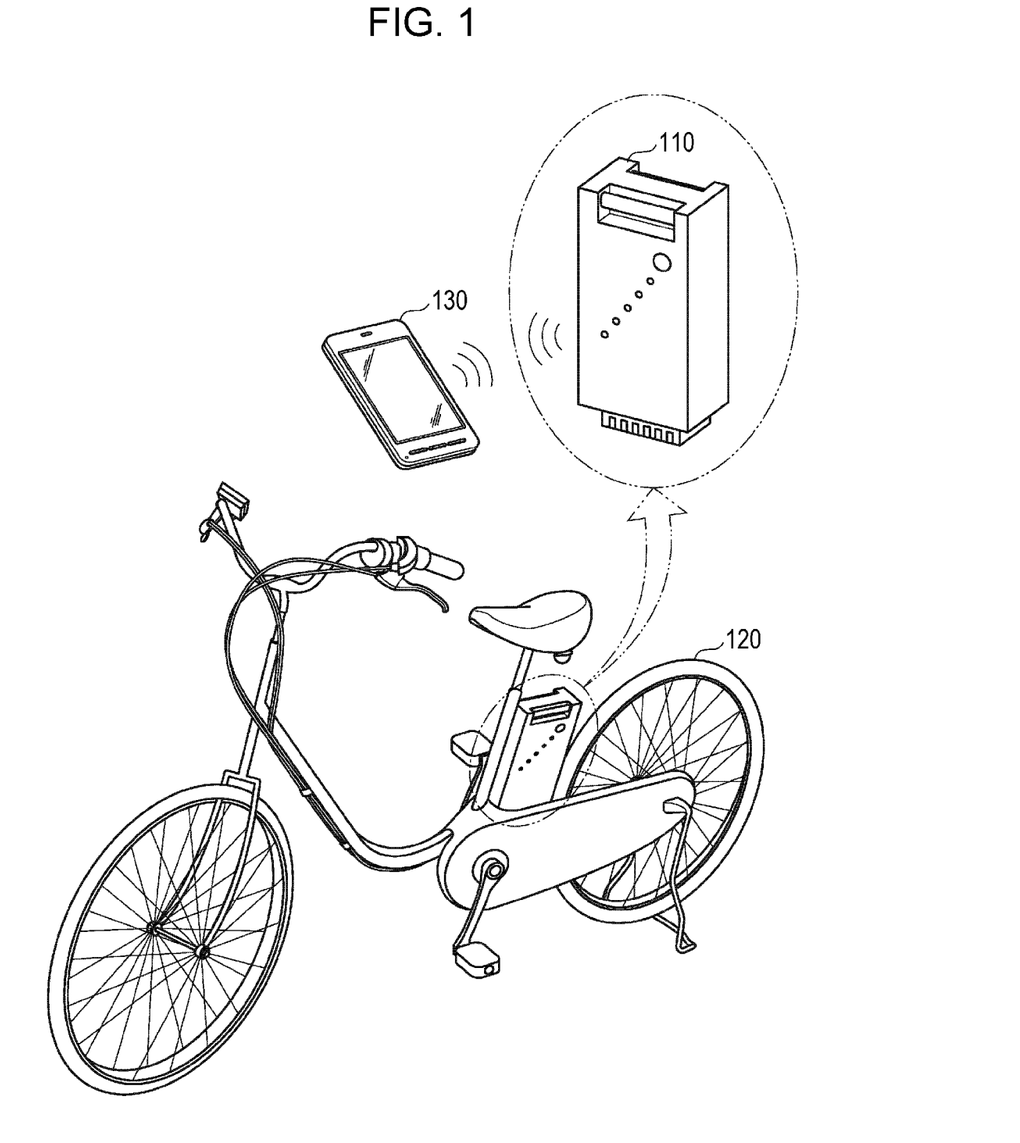
FIG. 1 is an overall schematic view of an abnormality detection system for an electrical-power storage device.

FIG. 1 is an overall schematic view of the configuration of the abnormality detection system. The abnormality detection system includes an electrical-power storage device 110, an electric bicycle 120 having the electrical-power storage device 110, and an information terminal 130.

The electric bicycle 120 has a power-assist function for assisting human power by operating a motor using the electrical-power storage device 110 as a power source. The electric bicycle 120 and the electrical-power storage device 110 have terminals. The electrical-power storage device 110 is fixed to the electric bicycle 120 so that the terminals of both the electric bicycle 120 and the electrical-power storage device 110 contact each other, and electrical power is supplied from the electrical-power storage device 110 to the electric bicycle 120 via the terminals that contact each other.

The information terminal 130 is, for example, a portable information terminal, such as a smartphone, and transmits/receives data to/from the electrical-power storage device 110 by using short-range wireless communication, such as Bluetooth (registered trademark) communication.

Figure 2:
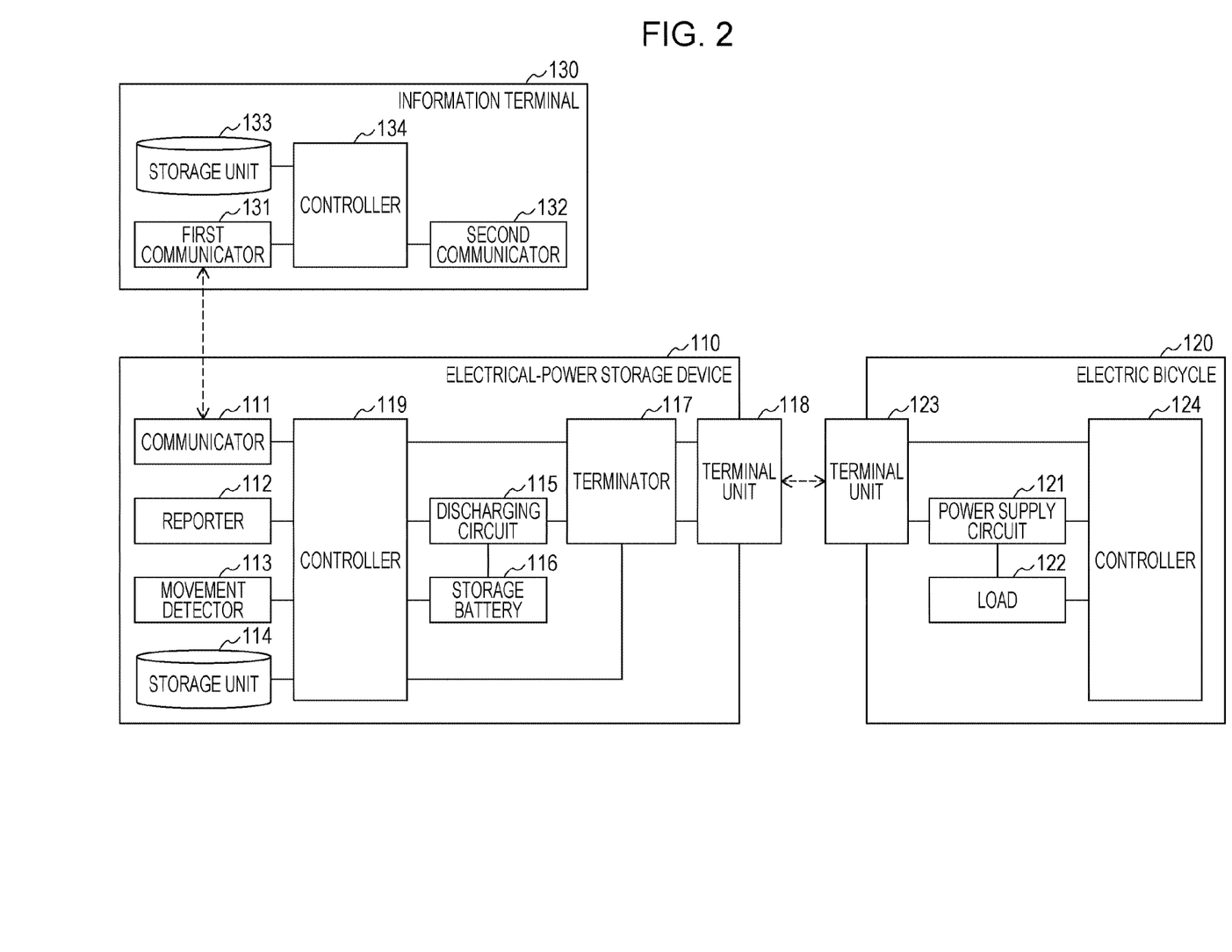
FIG. 2 is a functional block diagram of the abnormality detection system for the electrical-power storage device.

The functional configurations of the electrical-power storage device 110, the electric bicycle 120, and the information terminal 130 will be described with reference to FIG. 2.

<1-1. Electrical-Power Storage Device 110>

The electrical-power storage device 110 includes a communicator 111, a reporter 112, a movement detector 113, a storage unit 114, a discharging circuit 115, a storage battery 116, a terminator 117, a terminal unit 118, and a controller 119.

The communicator 111 is implemented using a chipset for wireless communication based on a predetermined short-range wireless communication standard and has a function for performing short-range wireless communication with the information terminal 130. Setting information for connecting to the information terminal 130, which is paired with the electrical-power storage device 110, is stored in the storage unit 114. When the paired information terminal 130 is present in a range in which communication is possible, the communicator 111 automatically connects to the information terminal 130 by using the setting information stored in the storage unit 114.

The reporter 112 is implemented using, for example, a speaker or a lamp and has a function for reporting the state of the electrical-power storage device 110 to a user.

The movement detector 113 is implemented using, for example, an acceleration sensor and has a function for sensing movement of the electrical-power storage device 110 by using a predetermined algorithm to process a signal output from the acceleration sensor.

The storage unit 114 is implemented using a volatile or nonvolatile storage device and stores therein the above-described setting information for connecting to the information terminal 130 through the short-range wireless communication.

The terminal unit 118 includes a discharging terminal pair for supplying electrical power to the electric equipment that uses the electrical-power storage device 110 as a power source and a communication terminal for communicating with the electric equipment.

The discharging circuit 115 is a circuit for controlling discharging of the storage battery 116 and has a function for outputting electrical power, accumulated in the storage battery 116, via the discharging terminal pair in the terminal unit 118 at a specified discharging current value and a specified discharging voltage value.

The storage battery 116 is, for example, a lithium-ion battery. Under the control of the discharging circuit 115, the storage battery 116 executes discharging.

The terminator 117 is a switch provided on an electrical-power supply line from the storage battery 116 to the terminal unit 118. Under the control of the controller 119, the terminator 117 is switched from an on state in which electrical power in the storage battery 116 can be output via the terminal unit 118 to an off state (shutoff state) in which electrical power in the storage battery 116 cannot be output via the terminal unit 118.

The electrical-power storage device 110 obtains, for example, an electrical power value requested by the electric equipment through communication via the communication terminal and determines the discharging current value, the discharging voltage value, and so on. The terminal unit 118 may communicate with a battery charger. The electrical-power storage device 110 is detachably connected to the electric equipment via a connection unit (not illustrated). The terminal unit 118 is provided in the connection unit, and the electrical-power storage device 110 is electrically connected to the electric equipment via the connection unit.

The controller 119 is implemented using a processor and a memory that holds a control program therein. The controller 119 has a function for controlling the individual elements in the electrical-power storage device 110 through execution of the control program by the processor.

<1-2. Electric Bicycle 120>

The electric bicycle 120 has a power supply circuit 121, a load 122, a terminal unit 123, and a controller 124.

The terminal unit 123 includes a power reception terminal pair for receiving power from the electrical-power storage device 110 and a communication terminal for communicating with the electrical-power storage device 110.

The power supply circuit 121 is a circuit for controlling electrical-power supply to the load 122 and has a function for supplying electrical power, input from the electrical-power storage device 110 via the power reception terminal pair in the terminal unit 123, to the load 122 at a specified current value and a specified voltage value.

The load 122 is a motor in the electric bicycle 120. Under the control of the power supply circuit 121, the load 122 operates to generate power for assisting human power. On the basis of the user's power applied to the pedals of the electric bicycle 120, the rotational speed of the tire(s), or the like, the electric bicycle 120 determines the power to be generated by the motor.

The electric bicycle 120 transmits an amount of electric power needed by the load 122 and so on to the electrical-power storage device 110 through communication via the communication terminal.

The controller 124 is implemented using a processor and a memory that holds a control program therein. The controller 124 has a function for controlling the individual elements of the electric bicycle 120 through execution of the control program by the processor.

<1-3. Information Terminal 130>

The information terminal 130 includes a first communicator 131, a second communicator 132, a storage unit 133, and a controller 134.

The first communicator 131 is implemented using a chipset for wireless communication based on a predetermined short-range wireless communication standard and has a function for performing short-range wireless communication with the electrical-power storage device 110. Setting information for connecting to the paired electrical-power storage device 110 is stored in the storage unit 133. When the paired electrical-power storage device 110 is present in a range in which communication is possible, the first communicator 131 automatically connects to the electrical-power storage device 110 by using the setting information stored in the storage unit 133.

The second communicator 132 is implemented using a chipset for wireless communication based on a predetermined wireless communication standard and has a function for connecting to the Internet through a mobile-phone channel or the like.

The storage unit 133 is implemented using a volatile or nonvolatile storage device and stores therein the above-described setting information for connecting to the electrical-power storage device 110 through the short-range wireless communication.

The controller 134 is implemented using a processor and a memory that holds a control program. The controller 134 has a function for controlling the individual elements in the information terminal 130 through execution of the control program by the processor.

Although not illustrated, the information terminal 130 has, for example, presenting means, such as a display or a speaker, and can present information generated by the information terminal 130 to the user.

<2. Operation>

Next, a description will be given of operations for processing executed by the abnormality detection system for the electrical-power storage device.

Figure 3:
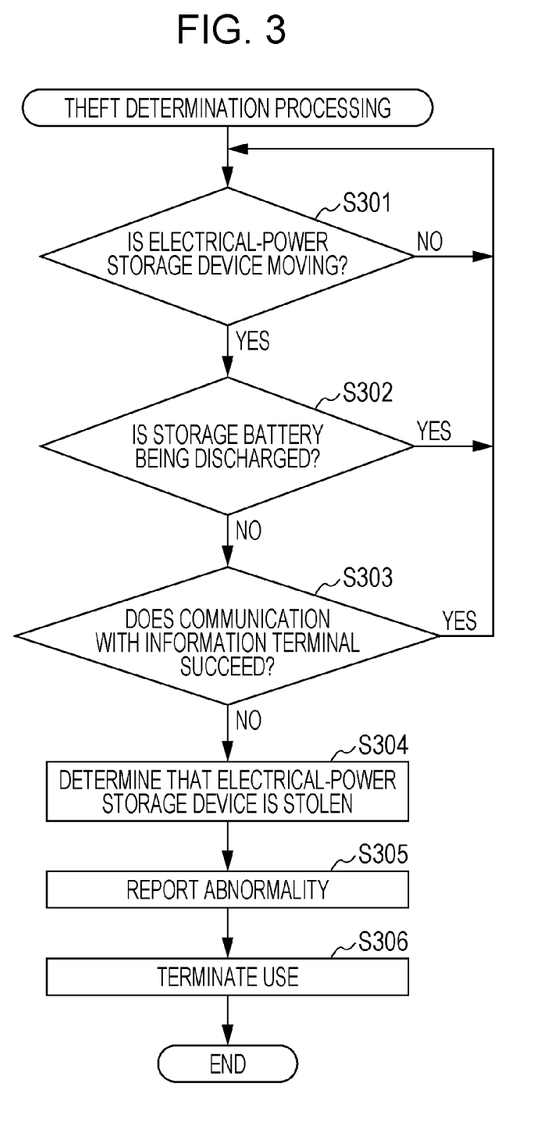
FIG. 3 is a flowchart of theft determination processing.

FIG. 3 is a flowchart illustrating operations for theft determination processing executed by the electrical-power storage device 110.

In step S301, the movement detector 113 in the electrical-power storage device 110 determines whether or not the electrical-power storage device 110 is moving. If the electrical-power storage device 110 is moving, the process proceeds to step S302, and if the electrical-power storage device 110 is not moving, the movement detector 113 waits until detecting the movement.

In step S302, the discharging circuit 115 in the electrical-power storage device 110 determines whether or not the storage battery 116 is being discharged, that is, whether or not electrical power is being supplied to the electric bicycle 120. If the storage battery 116 is not being discharged, the process proceeds to step S303, and if the storage battery 116 is being discharged, the process returns to step S301.

In step S303, the communicator 111 in the electrical-power storage device 110 determines whether or not communication with the information terminal 130 succeeds. If the communication with the information terminal 130 fails, the process proceeds to step S304, and if the communication with the information terminal 130 succeeds, the process returns to step S301.

In step S304, the controller 119 in the electrical-power storage device 110 determines that the electrical-power storage device 110 has an abnormality, in this example, determines that the electrical-power storage device 110 is stolen.

In step S305, the controller 119 in the electrical-power storage device 110 causes the reporter 112 to report the abnormality in the electrical-power storage device 110.

In step S306, the controller 119 in the electrical-power storage device 110 causes the use of the electrical-power storage device 110 to be terminated, that is, switches the terminator 117 to an off state in which electrical power in the storage battery 116 cannot be output via the terminal unit 118.

The theft determination processing illustrated in FIG. 3 will be further described with reference to FIGS. 4A and 4B.

If the result of the determination in step S301 is YES and the result of the determination in step S302 is NO, there is a possibility that the electric bicycle 120 connected with the electrical-power storage device 110 is being transported without using the power-assist function or the electrical-power storage device 110 removed from the electric bicycle 120 is being transported. Now, the description will be continued assuming that the electric bicycle 120 connected with the electrical-power storage device 110 is being transported.

Figure 4A:
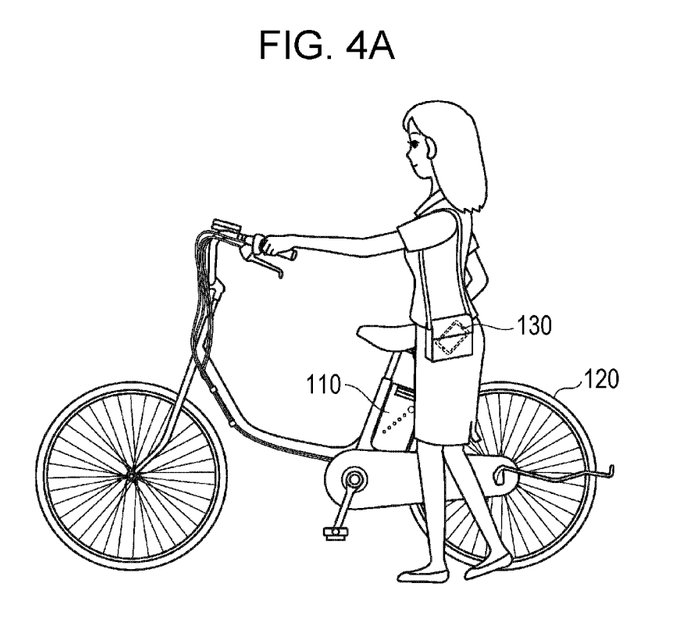
FIGS. 4A and 4B are overall schematic views of the electrical-power storage device during the theft determination processing.

When a legitimate user of the electrical-power storage device 110 is transporting the electric bicycle 120, the information terminal 130 paired with the electrical-power storage device 110 is present near the electrical-power storage device 110, as illustrated in FIG. 4A. Accordingly, if the communication with the information terminal 130 succeeds, it is determined that the legitimate user of the electrical-power storage device 110 is transporting the electric bicycle 120.

Figure 4B:
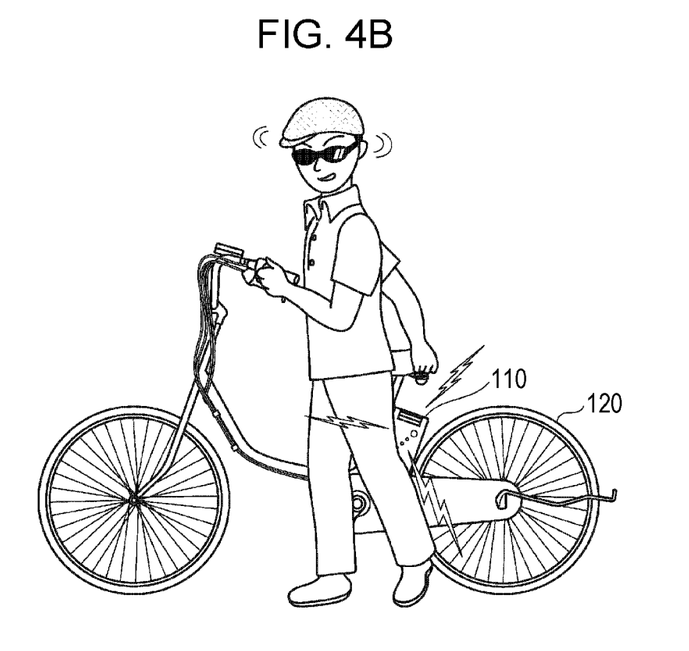

However, for example, if an illegitimate user, such as a thief, of the electrical-power storage device 110 is transporting the electric bicycle 120, the information terminal 130 paired with the electrical-power storage device 110 is not present near the electrical-power storage device 110, as illustrated in FIG. 4B. Thus, if the communication with the information terminal 130 fails even when the result of the determination in step S301 is YES and the result of the determination in step S302 is NO, it is determined that a thief is transporting the electrical-power storage device 110. The reporter 112 in the electrical-power storage device 110 then reports an abnormality in the electrical-power storage device 110 to the outside.

The description thus far has been given of the abnormality detection system in the present embodiment.

<3. Modifications>

While the abnormality detection system according to the present disclosure has been described above based on the particular embodiment, modifications can also be made as described below, and the present disclosure is not limited to the abnormality detection system described above in the embodiment.

(1) Although, in the above-described embodiment, the electric equipment having the electrical-power storage device 110 has been described as being an electric bicycle, the electric equipment is not limited thereto and may be any electric equipment that uses an electrical-power storage device as a power source.

(2) Although, in the embodiment described above, it is determined that the electrical-power storage device is in an abnormal state when the movement detector detects the movement, the discharging circuit does not detect discharging, and a communication with the information terminal fails, a method for determining that the electrical-power storage device is in an abnormal state is not limited thereto. For example, when a case in which electric equipment and an electrical-power storage device, included in the electric equipment, are moved when the electrical-power storage device is not being discharged is not envisaged, it may be determined that the electrical-power storage device is in an abnormal state, when the movement detector detects the movement, and the discharging circuit does not detect discharging, regardless of whether or not a communication with an information terminal succeeds.

(3) In the embodiment described above, when it is determined that the electrical-power storage device is in an abnormal state, the hardware switch puts the electrical-power storage device into a use stop state, that is, into a state in which the electrical-power supply from the electrical-power storage device to the electric equipment is disabled. However, the electrical-power supply from the electrical-power storage device to the electric equipment may be disabled through software control.

(4) In the embodiment described above, when it is determined that the electrical-power storage device is in an abnormal state, the state of the electrical-power storage device is put into the state in which the electrical-power supply from the electrical-power storage device to the electric equipment is disabled, but the state of the electrical-power storage device may be put into a state in which the electrical-power storage device cannot be charged with the battery charger. Needless to say, the state of the electrical-power storage device may be put into a state in which both the electric-power supply from the electrical-power storage device to the electric equipment and the charging of the electrical-power storage device with the battery charger are disabled.

(5) Although the timing at which the electrical-power storage device is put into the use stop state after it is determined that the electrical-power storage device is in an abnormal state is not clearly specified in the embodiment described above, the timing at which the electrical-power storage device is put into the use stop state may be any timing as long as the discharging from the electrical-power storage device to the electric equipment cannot be started and the charging of the electrical-power storage device with the battery charger cannot be started after it is determined that the electrical-power storage device is in an abnormal state.

(6) Although, in the embodiment described above, the reporter that reports that the electrical-power storage device is in an abnormal state is a speaker or a lamp, the reporter is not limited thereto. The reporter may be a communicator that can connect to the Internet through short-range wireless communication or the like via a wireless access point. According to this configuration, when the electrical-power storage device being transported by a thief passes by a wireless access point to which the electrical-power storage device can connect, a notification indicating that the storage battery is stolen can be given to a legitimate user, a battery management center, or the like through the Internet. In addition, during the notification, a notification indicating location information of the wireless access point may be given (a notification indicating location information of the electrical-power storage device may be given when the electrical-power storage device has a global positioning system (GPS) receiver), thereby making it possible to track the stolen electrical-power storage device.

(7) In the embodiment described above, the controller in the electrical-power storage device may determine that the storage battery is not executing discharging, when discharging control on the storage battery via the discharging circuit is not being performed, or may determine that the storage battery is not executing discharging, by using a current sensor for sensing electrical current discharged from the storage battery. In this case, a flag indicating that the controller in the electrical-power storage device is not performing discharging control on the storage battery via the discharging circuit is stored in the memory in the controller, and the controller reads the flag to thereby determine that the storage battery is not executing discharging.

<5. Supplement>

The configuration in the present disclosure will be further described below.

(1) An electrical-power storage device in a first aspect of the present disclosure includes: a storage battery; a movement detector that detects movement of the electrical-power storage device including the storage battery; a reporter that reports that the electrical-power storage device has an abnormality to outside; and a controller that causes the reporter to report that the electrical-power storage device has an abnormality, when the movement detector detects movement of the electrical-power storage device, and the storage battery is not executing discharging.

(2) An electrical-power storage device in a second aspect of the present disclosure further includes, in the electrical-power storage device in the first aspect described above, a communicator that performs short-range wireless communication with an information terminal of a user of the electrical-power storage device. When the movement detector detects movement of the electrical-power storage device, and the storage battery is not executing discharging, the controller attempts to communicate with the information terminal via the communicator, and when the communication succeeds, the controller does not cause the reporter to report that the electrical-power storage device has an abnormality, and when the communication fails, the controller causes the reporter to report that the electrical-power storage device has an abnormality.

(3) An electrical-power storage device in a third aspect of the present disclosure further includes, in the electrical-power storage device in the first or second aspect described above, a terminator that terminates use of the storage battery. After causing the reporter to report that the electrical-power storage device has an abnormality, the controller causes the terminator to terminate the use of the storage battery. The "use of the storage battery" as used herein refers to either charging the storage battery or discharging the storage battery or both thereof, and "terminating the use of the storage battery" refers to disabling either charging the storage battery or discharging the storage battery or both thereof.

(4) An electrical-power storage device in a fourth aspect of the present disclosure has, in the electrical-power storage device in the third aspect described above, a characteristic in that the controller does not permit the use of the storage battery, even when a request for starting the use of the storage battery is received after the terminator terminates the use of the storage battery.

(5) An electrical-power storage device in a fifth aspect of the present disclosure has, in the electrical-power storage device in the third aspect described above, a characteristic in that the controller does not permit charging of the storage battery after the terminator terminates the use of the storage battery.

(6) An electrical-power storage device in a sixth aspect of the present disclosure has, in the electrical-power storage device in the third aspect described above, a characteristic in that the controller does not permit discharging of the storage battery after the terminator terminates the use of the storage battery.

(7) An electrical-power storage device in a seventh aspect of the present disclosure has, in the electrical-power storage device in the first or second aspect described above, a characteristic in that the abnormality is that the electrical-power storage device is stolen.

The present disclosure makes it possible to detect an abnormality, such as a theft, of an electrical-power storage device and is useful as a method for managing the electrical-power storage device.

What is claimed is:

1. An electrical-power storage device, comprising:
   a storage battery;
   a movement detector that detects a movement of the electrical-power storage device including the storage battery;
   a reporter that reports that the electrical-power storage device has an abnormality to outside of the electrical power storage device; and
   a controller
     that determines whether or not the storage battery is being discharged during the detected movement of the electrical-power storage device,
     that causes the reporter to report that the electrical-power storage device has the abnormality, when the movement detector detects the movement of the electrical-power storage device while the controller determines that the storage battery is not being discharged, and
     that does not cause the reporter to report that the electrical-power storage device has the abnormality even when the movement detector detects the movement of the electrical-power storage device while the controller determines that the storage battery is being discharged.

2. The electrical-power storage device according to claim 1, further comprising:
   a communicator that performs a short-range wireless communication with an information terminal of a user of the electrical-power storage device,
   wherein, when the movement detector detects the movement of the electrical-power storage device while the controller determines that the storage battery is not being discharged, the controller attempts to communicate with the information terminal via the communicator,
   when the communication succeeds, the controller does not cause the reporter to report that the electrical-power storage device has the abnormality, and
   when the communication fails, the controller causes the reporter to report that the electrical-power storage device has the abnormality.

3. The electrical-power storage device according to claim 1, further comprising:
   a terminator that terminates use of the storage battery,
   wherein, after causing the reporter to report that the electrical-power storage device has the abnormality, the controller causes the terminator to terminate the use of the storage battery.

4. The electrical-power storage device according to claim 3,
   wherein the controller receives a request for starting a new use of the storage battery after the terminator terminates the use of the storage battery, and the controller does not permit the use of the storage battery in response to the request.

5. The electrical-power storage device according to claim 3,
   wherein the controller does not permit charging of the storage battery after the terminator terminates the use of the storage battery.

6. The electrical-power storage device according to claim 3,
wherein the controller does not permit discharging of the storage battery after the terminator terminates the use of the storage battery.

7. The electrical-power storage device according to claim 3,
wherein the movement detector detects a change in a location of the electrical-power storage device.

8. The electrical-power storage device according to claim 1,
wherein the abnormality is that the electrical-power storage device is stolen.

9. The electrical-power storage device according to claim 1,
wherein the controller causes the reporter not to report the abnormality regardless of whether or not the storage battery is determined to be discharging when the movement detector does not detect the movement of the electrical-power storage device.

10. The electrical-power storage device according to claim 1, wherein the movement of the battery is detected based on a detected acceleration of the battery by an acceleration sensor.

* * * * *